US010159002B2

(12) United States Patent
Sergeyev et al.

(10) Patent No.: US 10,159,002 B2
(45) Date of Patent: Dec. 18, 2018

(54) NETWORK MANAGEMENT

(71) Applicant: Intel IP Corporation, Santa Clara, CA (US)

(72) Inventors: Vadim Sergeyev, Nizhny Novgorod (RU); Alexander Maltsev, Nizhny Novgorod (RU); Alexei Davydov, Nizhny Novgorod (RU); Jong-Kae Fwu, Sunnyvale, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 50 days.

(21) Appl. No.: 14/903,576

(22) PCT Filed: Aug. 8, 2014

(86) PCT No.: PCT/US2014/050289
§ 371 (c)(1),
(2) Date: Jan. 7, 2016

(87) PCT Pub. No.: WO2015/021357
PCT Pub. Date: Feb. 12, 2015

(65) Prior Publication Data
US 2016/0156440 A1 Jun. 2, 2016

Related U.S. Application Data

(60) Provisional application No. 61/863,902, filed on Aug. 8, 2013.

(51) Int. Cl.
*G06F 11/00* (2006.01)
*H04J 1/16* (2006.01)
(Continued)

(52) U.S. Cl.
CPC ........ *H04W 16/26* (2013.01); *E04G 23/0218* (2013.01); *E04H 9/025* (2013.01);
(Continued)

(58) Field of Classification Search
CPC .. H04B 7/0626; H04B 7/0639; H04B 7/0617; H04W 64/006; H04W 36/32; H04W 8/02;
(Continued)

(56) References Cited

U.S. PATENT DOCUMENTS

2010/0311427 A1* 12/2010 Bouguen ........... H04W 52/0206
455/446
2011/0044284 A1* 2/2011 Voltolina ............. H04W 24/02
370/331
(Continued)

FOREIGN PATENT DOCUMENTS

KR 1020120060841 A 6/2012
KR 1020130087039 A 8/2013

OTHER PUBLICATIONS

International Search Report and Written Opinion for PCT/US2014/050289 dated Nov. 19, 2014; 11 pages.

*Primary Examiner* — Chuong T Ho
(74) *Attorney, Agent, or Firm* — Schwabe, Williamson & Wyatt, P.C.

(57) ABSTRACT

Embodiments relate to network management of a wireless network in which inactive cells are selectively activated thereby changing the radio environment of a user equipment. The changed radio environment is assessed to determine a preferred distribution of active cells for that user equipment.

23 Claims, 8 Drawing Sheets

(51) Int. Cl.
| | |
|---|---|
| H04L 1/00 | (2006.01) |
| H04L 12/26 | (2006.01) |
| H04W 16/26 | (2009.01) |
| H04W 76/14 | (2018.01) |
| H04W 4/70 | (2018.01) |
| H04L 5/14 | (2006.01) |
| H04W 56/00 | (2009.01) |
| H04W 72/04 | (2009.01) |
| H04W 52/02 | (2009.01) |
| H04W 36/08 | (2009.01) |
| H04W 72/08 | (2009.01) |
| H04W 36/28 | (2009.01) |
| H04L 5/00 | (2006.01) |
| H04L 27/26 | (2006.01) |
| H04W 24/10 | (2009.01) |
| H04L 1/18 | (2006.01) |
| H04B 7/06 | (2006.01) |
| E04G 23/02 | (2006.01) |
| E04H 9/02 | (2006.01) |
| H04W 24/02 | (2009.01) |
| H04W 48/16 | (2009.01) |
| H04W 74/08 | (2009.01) |
| H04W 8/02 | (2009.01) |
| H04W 36/32 | (2009.01) |
| H04W 64/00 | (2009.01) |
| H04W 76/27 | (2018.01) |
| H04W 76/10 | (2018.01) |
| H04W 4/02 | (2018.01) |
| H04W 36/14 | (2009.01) |
| H04W 88/08 | (2009.01) |
| H04W 48/12 | (2009.01) |
| H04W 88/04 | (2009.01) |
| H04W 88/02 | (2009.01) |

(52) U.S. Cl.
CPC ......... *H04B 7/0617* (2013.01); *H04B 7/0626* (2013.01); *H04B 7/0639* (2013.01); *H04L 1/1812* (2013.01); *H04L 5/006* (2013.01); *H04L 5/0048* (2013.01); *H04L 5/0053* (2013.01); *H04L 5/0058* (2013.01); *H04L 5/14* (2013.01); *H04L 27/2602* (2013.01); *H04W 4/70* (2018.02); *H04W 8/02* (2013.01); *H04W 24/02* (2013.01); *H04W 24/10* (2013.01); *H04W 36/08* (2013.01); *H04W 36/28* (2013.01); *H04W 36/32* (2013.01); *H04W 48/16* (2013.01); *H04W 52/0206* (2013.01); *H04W 52/0209* (2013.01); *H04W 52/0219* (2013.01); *H04W 56/0005* (2013.01); *H04W 64/006* (2013.01); *H04W 72/0406* (2013.01); *H04W 72/0446* (2013.01); *H04W 72/082* (2013.01); *H04W 74/0833* (2013.01); *H04W 76/10* (2018.02); *H04W 76/14* (2018.02); *H04W 76/27* (2018.02); *H04L 5/1469* (2013.01); *H04W 4/023* (2013.01); *H04W 36/14* (2013.01); *H04W 48/12* (2013.01); *H04W 88/02* (2013.01); *H04W 88/04* (2013.01); *H04W 88/08* (2013.01); *Y02D 70/00* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/21* (2018.01); *Y02D 70/22* (2018.01); *Y02D 70/23* (2018.01); *Y02D 70/24* (2018.01)

(58) Field of Classification Search
CPC . H04W 16/26; H04W 52/0219; H04W 48/16; H04W 24/02; H04W 24/01; H04W 76/02; H04W 76/046; H04W 52/0209; H04W 76/023; H04W 56/0005; H04W 52/0206; H04W 36/08; H04W 72/082; H04W 4/005; H04W 88/04; H04W 48/12; H04W 74/0833; H04W 88/08; E04H 9/025; E04G 23/0218; H04L 1/1812; H04L 5/0058; H04L 5/14; H04L 27/02
USPC .............. 370/328, 329, 330, 252, 254, 253
See application file for complete search history.

(56) References Cited

U.S. PATENT DOCUMENTS

| | | | |
|---|---|---|---|
| 2011/0134774 A1* | 6/2011 | Pelletier .............. | H04W 52/365 370/252 |
| 2011/0190022 A1 | 8/2011 | Rudrapatna | |
| 2013/0053091 A1* | 2/2013 | Jorguseski ............ | H04W 24/02 455/524 |
| 2013/0065600 A1 | 3/2013 | Lim | |
| 2013/0070609 A1* | 3/2013 | Hultell ...................... | H04L 5/06 370/241 |
| 2014/0056243 A1* | 2/2014 | Pelletier ................ | H04W 74/04 370/329 |
| 2014/0162631 A1* | 6/2014 | Wang .................... | H04W 36/22 455/425 |
| 2014/0335851 A1* | 11/2014 | Jorguseski ............ | H04W 24/02 455/424 |
| 2014/0369188 A1* | 12/2014 | Seleznyov .............. | H04W 4/50 370/229 |

* cited by examiner

NETWORK MANAGEMENT

CROSS REFERENCE TO RELATED APPLICATIONS

The present application is a national phase entry under 35 U.S.C. § 371 of International Application No. PCT/US2014/050289, filed Aug. 8, 2014, entitled "NETWORK MANAGEMENT", which claims priority to U.S. Provisional Patent Application No. 61/863,902, filed Aug. 8, 2013, entitled "ADVANCED WIRELESS COMMUNICATION SYSTEMS AND TECHNIQUES," the entire disclosures of which are hereby incorporated by reference in their entireties.

TECHNICAL FIELD

Embodiments relate to network management and, more particularly, to wireless network management.

BACKGROUND

As advances in wireless communication technology progress, it is desirable to improve the capacity of LTE-A networks by deploying heterogeneous networks comprising various cells sizes such as, for example, macrocells, microcells, picocells and femtocells. Such a layered cell structure provides a challenging radio environment from a power management perspective with the concomitant risk that a user equipment (UE) might be sub-optimally served by a respective evolved Node B (eNB) when there could be a better eNB to serve that UE.

BRIEF DESCRIPTION OF THE DRAWINGS

Embodiments described herein are illustrated, without limitation, by way of example, in the accompanying drawings.

DESCRIPTION OF EMBODIMENTS

Figure 1:
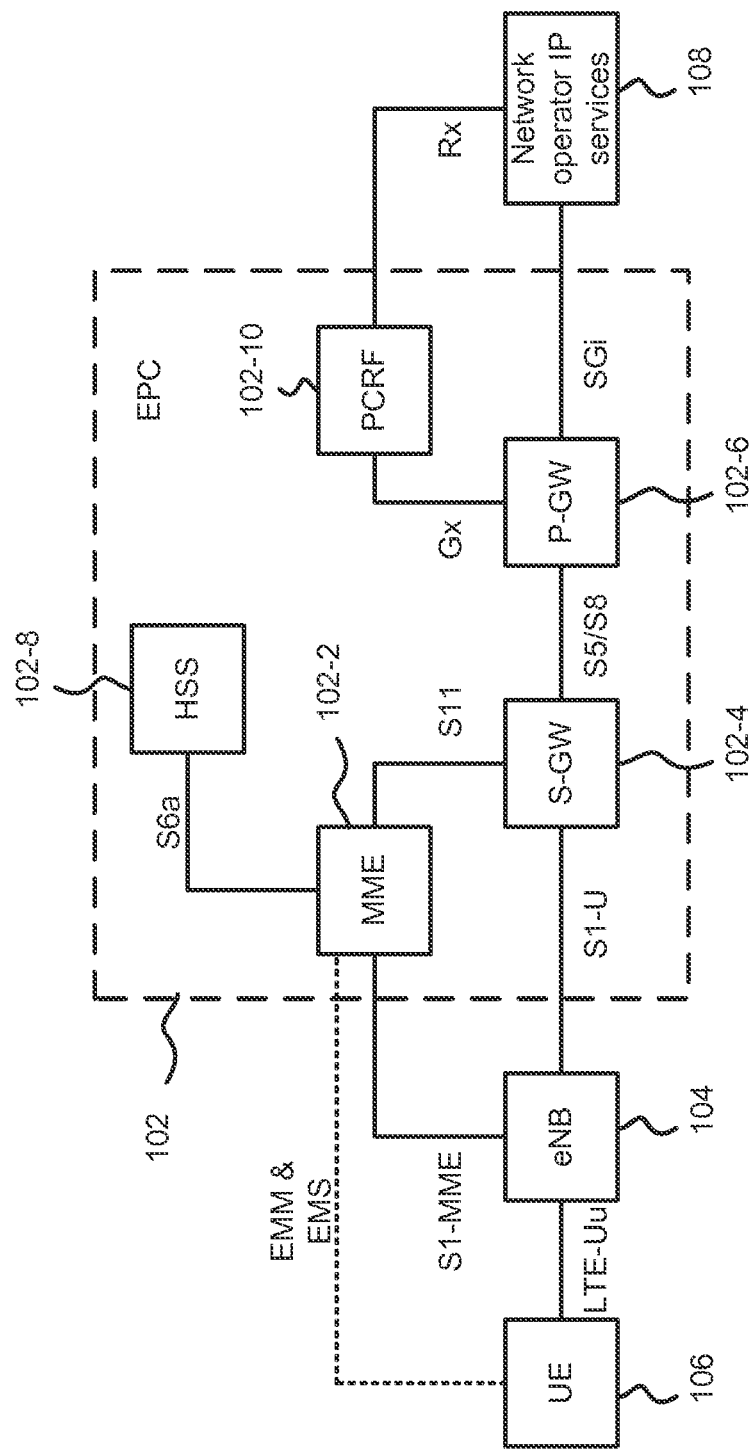
FIG. 1 shows an Evolved Packet System.

FIG. 1 shows an Evolved Packet System (EPS) 100. The EPS 100 comprises an Evolved Packet Core (EPC) 102, an eNode B (eNB) 104, a user equipment (UE) 106 and an operator packet data network 108.

The EPC 102 has a mobile management entity (MME) 102-2. The EPC 102 also comprises a serving gateway (S-GW) 102-4 and a packet data network gateway (P-GW) 102-6. The S-GW 102-4 is operable to exchange packets with the eNB 104 that is serving the UE 106. The S-GW 102-4 operates in effect as a router supporting data exchange between the UE 106 and the P-GW 102-6. The P-GW 102-6 serves as a gateway to external packet data networks such as, for example, network 108. The P-GW 102-6 also performs other functions such as address allocation, policy enforcement, packet filtering and routing. It can be appreciated that the packet data network gateway 102-6 communicates with the external packet data networks via an SGi interface.

The MME 102-2 performs signaling such that data packets do not pass through the MME 102-2, which decouples data from signaling to support developing capacity for signaling and data separately. The MME 102-2 is operable to control many aspects of UE 106 engagement such as, for example, paging the UE 106, tracking area management, authentication, gateway selection, roaming, security and the like.

The eNB 104 is responsible for providing the air interface, LTE-Uu, via which the UE 106 can transmit and receive packets. The eNB 104 performs various functions such as, for example, admission control to allow the UE 106 access to the EPS 100 and radio resource management.

The eNB 104 and the MME 102-2 communicate via an S1-MME interface. Optionally, and not shown, the eNB 104 can be connected to one or more other eNBs either directly via an X2 interface or indirectly via the S1-MME interface.

The eNB 104 is an embodiment of a set of base stations. Such a set of base stations can comprise one or more than one base station. Since the eNB 104 is illustrated as serving the UE 106, it is said to be an active base station. Therefore, the eNB 104 is an embodiment of a set of active base stations. Such a set of active base stations can comprise one or more than one active base station. Conversely, if eNB 104 was not serving the UE 106, or any other UE, it would be said to an inactive base station such that the eNB 104 would be an embodiment of a set of inactive base stations. Such a set of inactive base stations can comprise one or more than one inactive base station. Typically, a network, such as a mobile network, has a set of base stations comprising a set of active base stations and a set of inactive base stations. One skilled in the art understands that an eNB can be a species of the genus "base station" and that embodiments of the present invention can be implemented or realised using one or more than one base station.

The EPC 102 comprises a home subscriber server (HSS) 102-8. The HSS 102-8 is a centrally accessible database containing subscriber data associated with one or more than one UE such as, for example the UE 106.

One skilled in the art appreciates that the various interfaces described above are implemented to exchange data between the UE 106 and the P-GW 102-6 using user plane protocols such as, for example, GPRS tunneling protocol user part (GTP-U), and, for example, Generic Routing Encapsulation (GRE); the latter can be used to realise the S5/S8 interface.

The EPS 100 uses a plurality of signaling protocols. Air interface signaling, via which the eNB 104 influences or otherwise controls the radio resources used by the UE 106, is realised using a radio resource control (RRC) protocol. The S1-MME link or interface is realised using the S1 application protocol (S1-AP).

The MME 102-2 controls the UE 106 using two air interface non access stratum protocols, which are the EPS session management (ESM) protocol, which controls data streams associated with the external packet data network 108, and the EPS mobility management (EMM) protocol, which manages the internal operation of the EPC 102. EMM and EMS messages are exchanged with the UE 106 using RRC and S1-AP messages using the S1-MME and LTE-Uu interfaces.

The S11 interface signaling and the S5/S8 interface signaling are implemented using the GPRS tunneling protocol control part (GTP-C).

The EPC 102 also comprises a Policy Control Rule Function (PCRF) network entity 102-10. The PCRF 102-10 is responsible for establishing a number of performance objectives. Examples of the performance objectives can comprise at least one of quality of service (QoS) and charging goals for each session based on a respective or committed service level per UE and service type.

Figure 2:
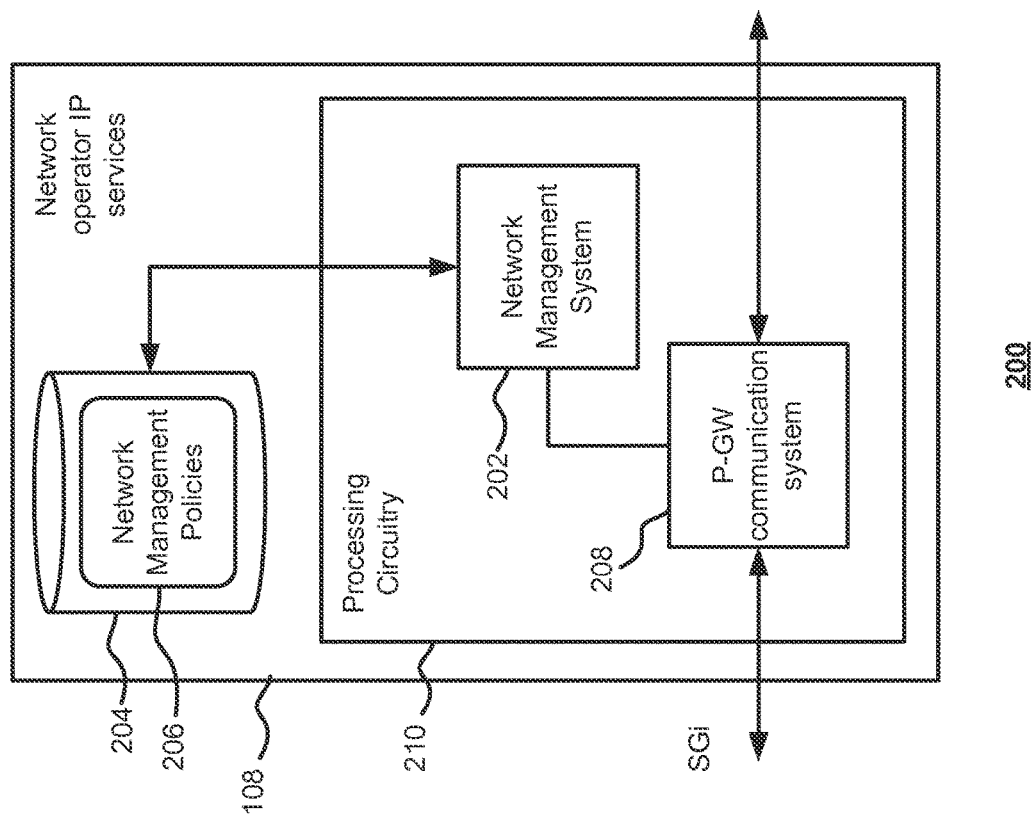
FIG. 2 depicts a network management system.

Referring to FIG. 2, there is shown an expanded view 200 of the network operator IP network 108. It can be appreciated that the IP network 108 comprises a network management system (NMS) 202. The network management system 202 is used to manage cells formed by the eNB 104 and other eNBs. The network management system 202 has access to storage 204. The storage 204 is used to store one or more than one network management policy 206. A network management policy can be used to influence the operation and control of the network provided by the one or more eNBs that form the geographical areas, known as cells, within or via which radio service coverage is provided.

The network management system 202 is arranged to implement the network management policies 206 by communicating with the P-GW 102-6 via a P-GW communication system 208. Embodiments can be realised in which the P-GW communication system 208 implements the above-described data and signaling via the SGi interface.

The network management policy can contain one or more than one objective or criterion against which the performance of the network can be assessed. One such objective is managing the power consumption of at least one of the UE 106 and the eNB 104 during an exchange, which exchange can comprise a data exchange, a signaling exchange or both. The power consumption management objective can be directed to reducing at least the overall power consumption.

Additionally, or alternatively, at least one criterion against which the performance of the network can be assessed is a performance metric comprising a measure associated with at least one of: a received power associated with the user equipment and the at least one active base station, a quality of service associated with one or both of the user equipment and the at least one active base station, a traffic load associated with the at least one active base station, a signal to noise ratio of a predetermined signal of at least one of the user equipment and the at least one active base station, a signal to interference and noise ratio of a predetermined signal of at least one of the user equipment and the at least one active base station, interference associated with a predetermined signal of at least one of the user equipment and the at least one active base station, a location associated with the at least one active base station, a mutual location associated with the user equipment and the at least one active base station, a number of user equipments associated with the at least one active base station, and channel state information associated with the at least one active base station taken jointly and severally in any and all permutations.

One skilled in the art will appreciate that the network management system 202 may comprise processing circuitry 210 to perform the processing described herein. The processing circuitry 210 may comprise at least one of logic, one or more than one processor, circuitry and executable code for execution by the one or more than one processor, all taken jointly and severally in any and all permutations, to realise the functions performed by the network management system 202 as described herein.

Figure 3:
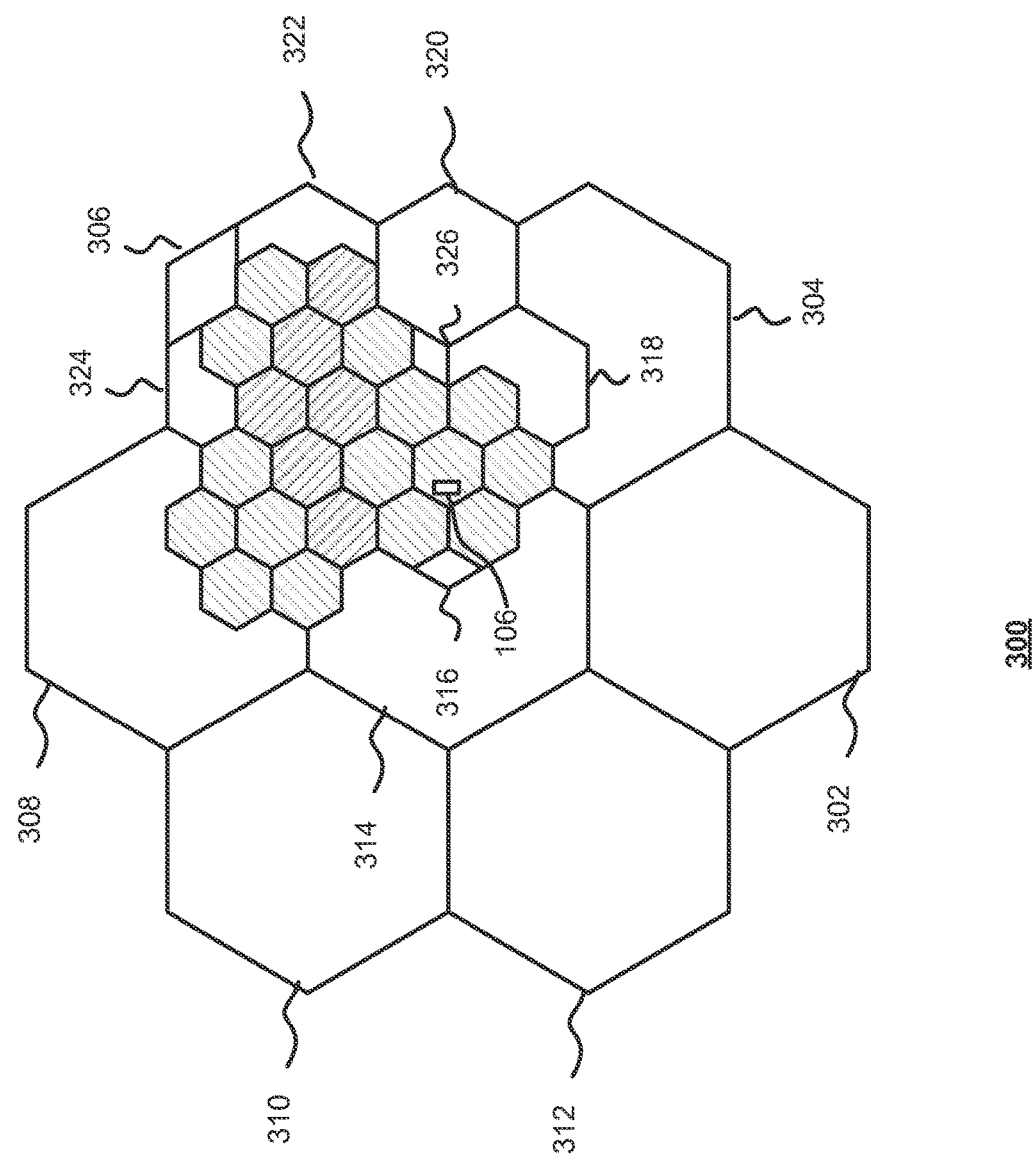
FIG. 3 illustrates a first view of a cellular system.

Referring to FIG. 3, there is shown a view of a cellular system 300 provided by a number of eNBs of respective cells. The eNBs can be an eNB such as the eNB 104 described above. In the illustrated embodiment, the cellular system 300 comprises multiple base station classes, which, in turn, define respective cell classes or cell sizes. It will be appreciated that an eNB such as the above-described eNB 104 is an embodiment of a base station. The base station classes can be defined with respect to a predetermined parameter. Embodiments are provided in which the predetermined parameter is associated with base station transmit power. Embodiments are provided in which the predetermined parameter is a rated output power, PRAT, of a base station, which is the mean power level per carrier for a base station operating in single carrier, multi-carrier or carrier aggregation configurations available at an antenna connector during a transmitter ON period. Also shown in FIG. 3 is the UE 106.

It will be appreciated that different PRATs can be defined for different base stations. Embodiments are provided in which the rated output power, PRAT, of the eNBs forming the cellular system 300 correspond to a wide area base station having no upper PRAT limit, a medium range base station having an upper PRAT limit of less than or equal to a first respective level, such as, for example, +38 dBm, a local area base station having an upper PRAT limit of a second respective level such as, for example, +24 dBm, and a home base station having an upper PRAT limit of less than or equal to at least a third respective level such as, for example, +20 dBm for a first respective number, such as, for example, one, of transmit antenna ports, less than or equal to +17 dBm for a second respective number, such as, for example, two, of transmit antenna ports, +14 dBm for a third respective number such as, for example, four, of transmit antenna ports and +11 dBm for a fourth respective number such as, for example, eight, of transmit antenna ports.

In FIG. 3, a number of larger cells 302 to 314 are provided. In the illustrated embodiment, eight such larger cells 302 to 314 are provided. The larger cells 302 to 314 correspond to eNBs that are classified as wide area base stations. A number of smaller cells 316 to 326 are provided. In the illustrated embodiment, six such smaller cells 316 to 326 are provided. The smaller cells 316 to 326 correspond to eNBs that are classified as medium range base stations.

A number of still smaller cells are also provided. In the illustrated embodiment, twenty-one such still smaller cells are provided. The still smaller cells correspond to eNBs that are classified as at least one of local area base stations and home base stations. The still smaller base stations are shown in greater detail in FIG. 4.

Figure 4:
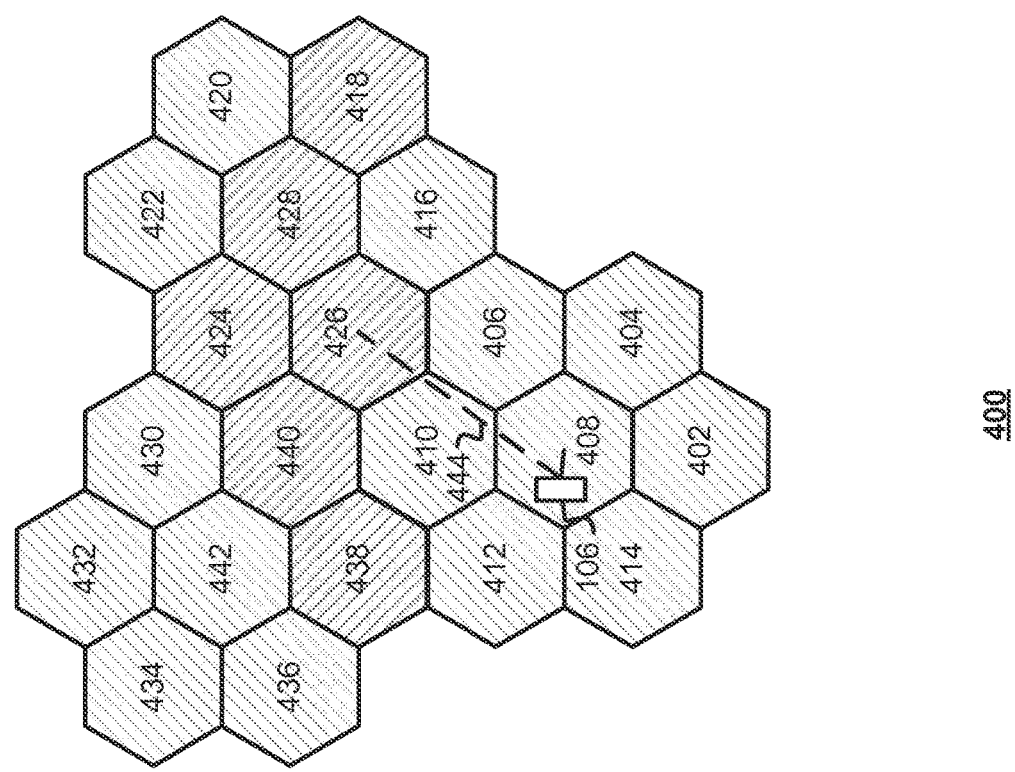
FIG. 4 shows a first enlarged view of part of the cellular system.

FIG. 4 shows a view 400 of the still smaller base stations 402 to 442. In the embodiment illustrated the still smaller base stations can be grouped into cell patterns, with cells 402 to 414 forming a first cell pattern comprising a respective number of cells, cells 416 to 428 forming a second cell pattern comprising a respective number of cells and cells 430 to 442 forming a third cell pattern comprising a respective number of cells. In the illustrated embodiment the first to third cell patterns are formed from a seven-cell repeating pattern. In the illustrated embodiment, the still smaller cells have eNBs corresponding to the home base station class of base stations. Although the embodiment uses a common repeating cell pattern, embodiments are not limited thereto. Embodiments can be realised in which the still smaller cells do not form a cell pattern. Alternatively, or additionally, embodiments can be realised in which the first to third cell patterns are different rather than being a repeating cell-pattern and, in particular, rather than being a seven-cell repeating cell pattern.

An eNB of a cell can have one of a number of predefined states. Embodiments can be realised in which an eNB of a cell has one of two states. Embodiments can be realised in which an eNB of a cell is in either an ON state or an OFF state. An ON state is defined as a state in which the eNB of the cell is available to serve a user equipment. An eNB can be available to serve a UE by transmitting, for example, a control signal that allows a user equipment to select the eNB of that cell as being a preferred eNB to provide a service to that UE. An ON state is an embodiment of an active state. An eNB in an ON state is an embodiment of an active base station. An OFF state is defined as a state in which the eNB of the cell is not in an ON state. Therefore, an embodiment of an OFF state is a state in which the eNB of the cell is not available to serve a user equipment. An OFF state is an embodiment of an inactive state. An eNB in an OFF state is an embodiment of an inactive base station.

In the embodiment illustrated, cells 418, 424, 426, 428, 438 and 440 have one or more than one respective eNB that is in an active state. In the illustrated embodiment, all of the remaining cells have one or more than one eNB that is in an inactive state.

Cell 426 is shown, by virtue of the dashed line 444 connecting the UE 106 and the cell 426, as having an active eNB that is serving the UE 106. A cell is said to be serving a UE when the eNB of that cell is supporting a data transfer or other exchange with the UE 106 or is at least available for such a transfer or other exchange.

It can be appreciated that the geographical distribution of the ON cells 418, 426, 428, 438 and 440 is sub-optimal relative to the present network demand. The UE 106 and eNB 104 of the serving cell 426 will both be transmitting at a determined power level appropriate to the separation between them and the channel conditions between them. It can also be appreciated that the overall set of still smaller cells comprises at least two sets of cells, that is, a set of active cells and a set of inactive cells. The set of active cells comprises cells 418, 424, 426, 428, 438 and 440. The set of inactive cells comprises cells 402, 404, 406, 408, 410, 412, 414, 416, 420, 422, 430, 432, 434, 436, 442.

Figure 5:
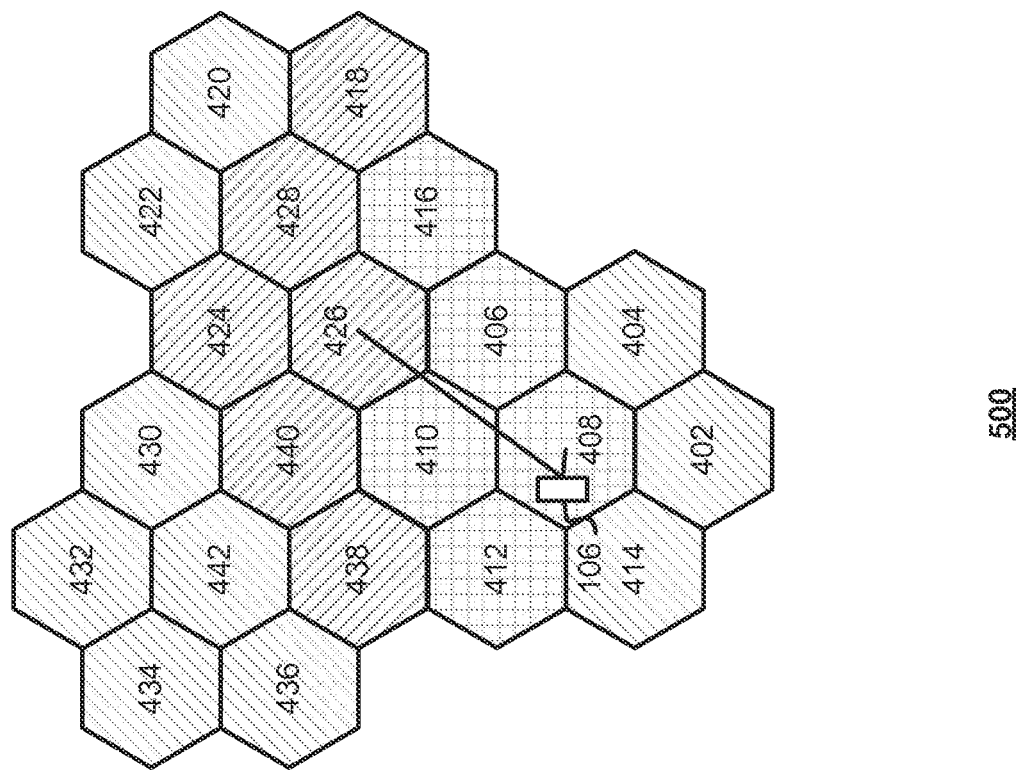
FIG. 5 illustrates a second enlarged view of part of the cellular system.

Referring to FIG. 5, there is shown a further view 500 of the still smaller cells described above with respect to FIG. 4. The network management system 202 is arranged to select a first set of inactive cells, that is, inactive base stations, to be switched, at least temporarily, to an active state. In the illustrated embodiment, it can be appreciated that inactive cells 406, 408, 410, 412, 416 have been selected by the network management system 202 to be made active. One skilled in the art will appreciate that selecting such a first set of inactive cells is an embodiment of activating a first set of selected base stations of a set of inactive base stations. It will be appreciated that not all inactive base stations have been selected to be made active. Although embodiments could be realised in which all inactive base stations could have been selected to be made active, such an embodiment could have adverse consequences from a power consumption perspective.

Making the inactive cells 406, 408, 410, 412, 416 active will change the radio environment from the perspective of at least the UE 106. The network management system 202 is arranged to request that the UE 106 produces data associated with the performance of the network such as, for example, data associated with the prevailing radio environment from the perspective of the UE 106. The data associated with the performance of the network, such as, for example, the data associated with the radio environment, is used to determine whether or not a different geographical distribution of cells better serves the demands of the UE 106 measured against at least one criterion. Embodiments can be realised in which the at least one criterion is transmit power of one or more than one of the eNBs that are active, the transmit power of the UE 106 or both. Additionally, or alternatively, the at least one criterion can be a measure of the distance between the UE 106 and one or more than one of the eNBs of the active cells.

The network management system 202 receives and processes the data associated with the performance of the network to determine whether or not a different geographical distribution of cells would be more appropriate. It will be appreciated that such receiving and processing are embodiments of assessing at least one performance metric associated with at least one active base station of the active base stations.

In the illustrated embodiment, it can be appreciated that the UE 106 would be better served by the eNB associated with cell 408 when measured against the either of the above specified criteria of transmit power or distance or both. Therefore, the network management system 202 is arranged to form a further set of active cells. The further set of active cells includes the cell 408 that is better suited to serving UE 106. Embodiments can be realised in which the further set of active cells comprises only the cell 408 serving the UE 106. The remaining cells, that is, those that were made active having formerly been inactive and those that were active in any event, can be made inactive on the assumption that they are not required to support the UE 106, or any other UE. It will be appreciated that making such cells inactive is an embodiment of deactivating a set of selected base stations of the active base stations in response to assessing the at least one performance metric associated with at least one active base station. In such an embodiment, only the cell 408 most appropriate to serving UE 106 would remain active. It can be appreciated that this would improve the power consumption of the network as a whole because only the eNB of the active cell 408 and the UE 106 would be transmitting. It can be appreciated that this would also improve the power consumption of at least one of the selected cell 408 and the UE 106 because the distance between the selected cell 408 and the UE 106 is less than the distance between the UE 106 and the former serving cell 426.

Alternatively, or additionally, embodiments can be realised in which the network management system 202 applies one or more than one rule of a set of rules that can be used to expand the further set of active cells. The set of rules can form part of the above described policies 206. Therefore, referring to FIG. 6, there is shown a view 600 of an embodiment in which the network management system 202 has applied a rule that adds a still further set of cells to the further set of active cells. The still further set of cells can comprise, for example, all cells that neighbour the selected active cell 408, or selected cells of the cells that neighbour the selected active cell 408. The network management system 202 is arranged to form such a still further set of cells active cells. Therefore, in total, the further set of active cells comprises cells 402, 404, 406, 408, 410, 412, and 414. It will be appreciated that a mobile UE 106 will have a relatively high chance of moving from the presently serving active cell 408 into one cell of the still further set of cells, that is, one of the neighbouring cells in the illustrated embodiment.

Alternatively, or additionally, the network management system 202 can store additional data associated with the network and that additional data can be used in expanding or establishing the further set of active cells. For example, data associated with a cell may indicate whether or not that cell serves a section of, for example, a motorway, highway or other type of road. Therefore, the additional data may comprise cell data that identifies other cells associated with the same section of motorway, highway or other type of road. Therefore, the network management system 202 is arranged to expand the further set of active cells to include one or more than one further cell associated with the section of the motorway, highway or other type of road. In such an embodiment, the further set of active cells can span an elongate geographical region or any other shaped geographical region. It will be appreciated that the further set of active cells can therefore comprise a selected cell and one or more than one additional cell that is prescribed for selection by data associated with the selected cell. For example, the additional data associated with selected cell 408 may indicate that whenever cell 408 is selected, then cell 406 must also be selected.

Figure 6:
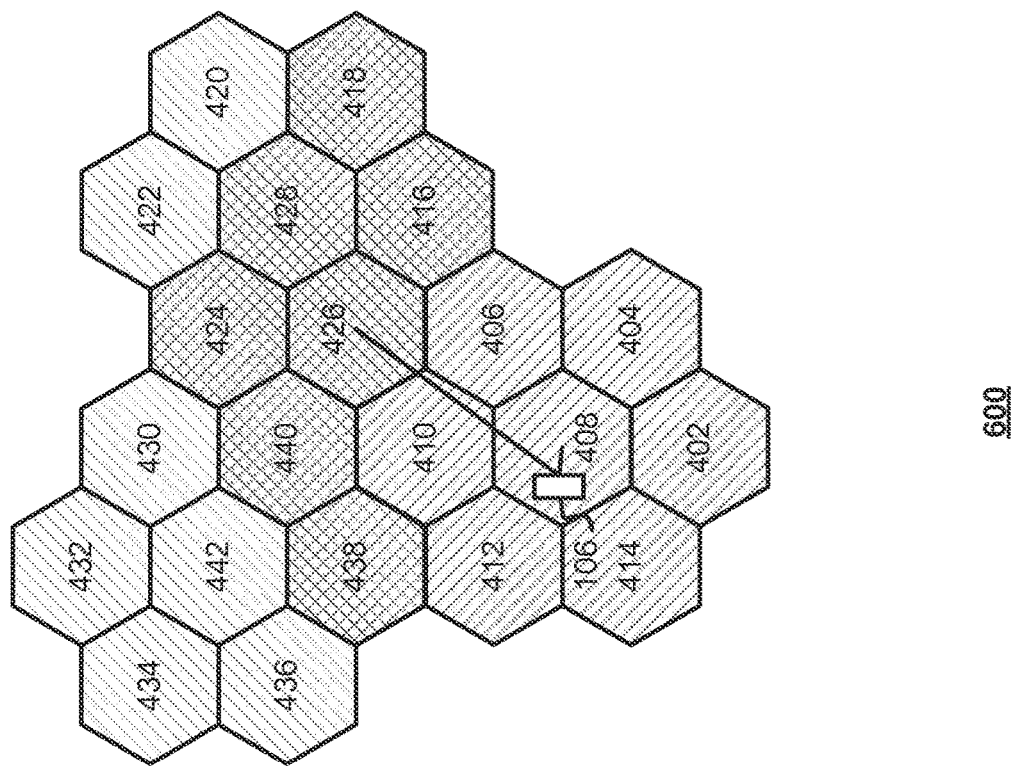
FIG. 6 depicts a third enlarged view of part of the cellular system.

Referring still to FIG. 6, it can be appreciated that formerly active cells 416, 418, 424, 426, 428, 438, and 440 have been made inactive, that is, switched OFF.

The one or more than one rule applied by the network management system 202 in constructing the further set of active cells can form part of one or more than one network management policy of the network management policies 206.

Embodiments can be realised in which an eNB of a cell that has been selected to be made active, at least temporarily, is arranged to transmit a predetermined signal that can be used in assessing the performance of the network, such as, for example, assessing the prevailing or resulting radio environment. An embodiment can be realised in which such a predetermined signal is a reference signal. The reference signal can comprise a cell specific reference signal, a UE specific reference signal, an MBMS reference signal, a positioning reference signal, a CSI reference signal, a sounding reference signal, or any other signal that can be used by the UE 106 to assess the radio environment and provide data associated with that assessment to the eNBs of cells from which the UE 106 can receive such signals.

Figure 7:
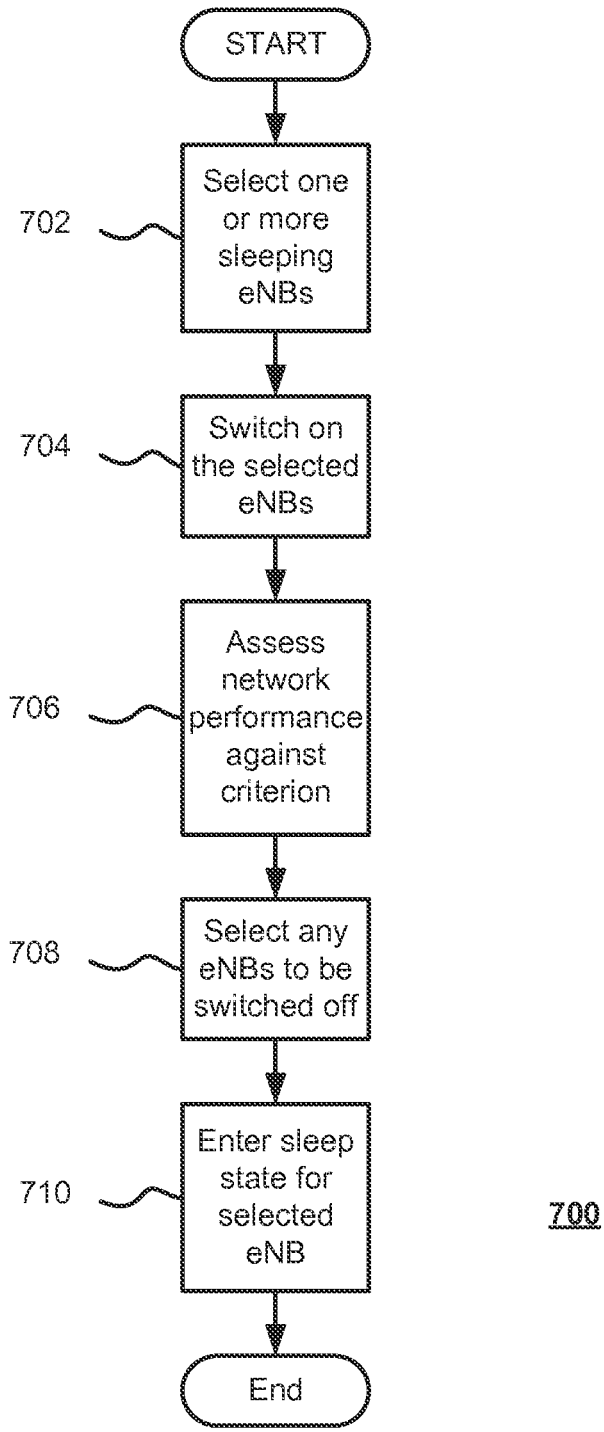
FIG. 7 illustrates a first flowchart for network management.

Referring to FIG. 7, there is shown a flowchart 700 associated with an embodiment. The network management system 202, or, more particularly, the processing circuitry 210 of the NMS 202, can be configured to implement the processing depicted in and described with reference to FIG. 7. At step 702, a first set of inactive cells is selected from inactive cells of a cellular system. Selected cells of the first set of inactive cells are made active. Embodiments can be realised in which making the first set of cells active comprises switching ON the cells of the first set of inactive cells on the assumption that they were formerly in an OFF state. The performance of the network, such as for example, the performance of the resulting or prevailing radio environment, is assessed, at step 706, against at least one criterion. It will be appreciated that the assessment, at 706, is an embodiment of assessing at least one performance metric associated with at least one active base station of the active base stations. Embodiments are provided in which the at least one criterion is power consumption of at least one of the UE 106 and at least one active base station. In light of the assessment, a determination is made regarding which active cell or active cells should be switched OFF at step 708. Those active cells selected to be switched OFF are switched OFF at step 710. It will be appreciated that switching OFF selected active cells is an embodiment of deactivating a set of selected base stations of the active base stations in response to assessing the performance metric.

Figure 8:
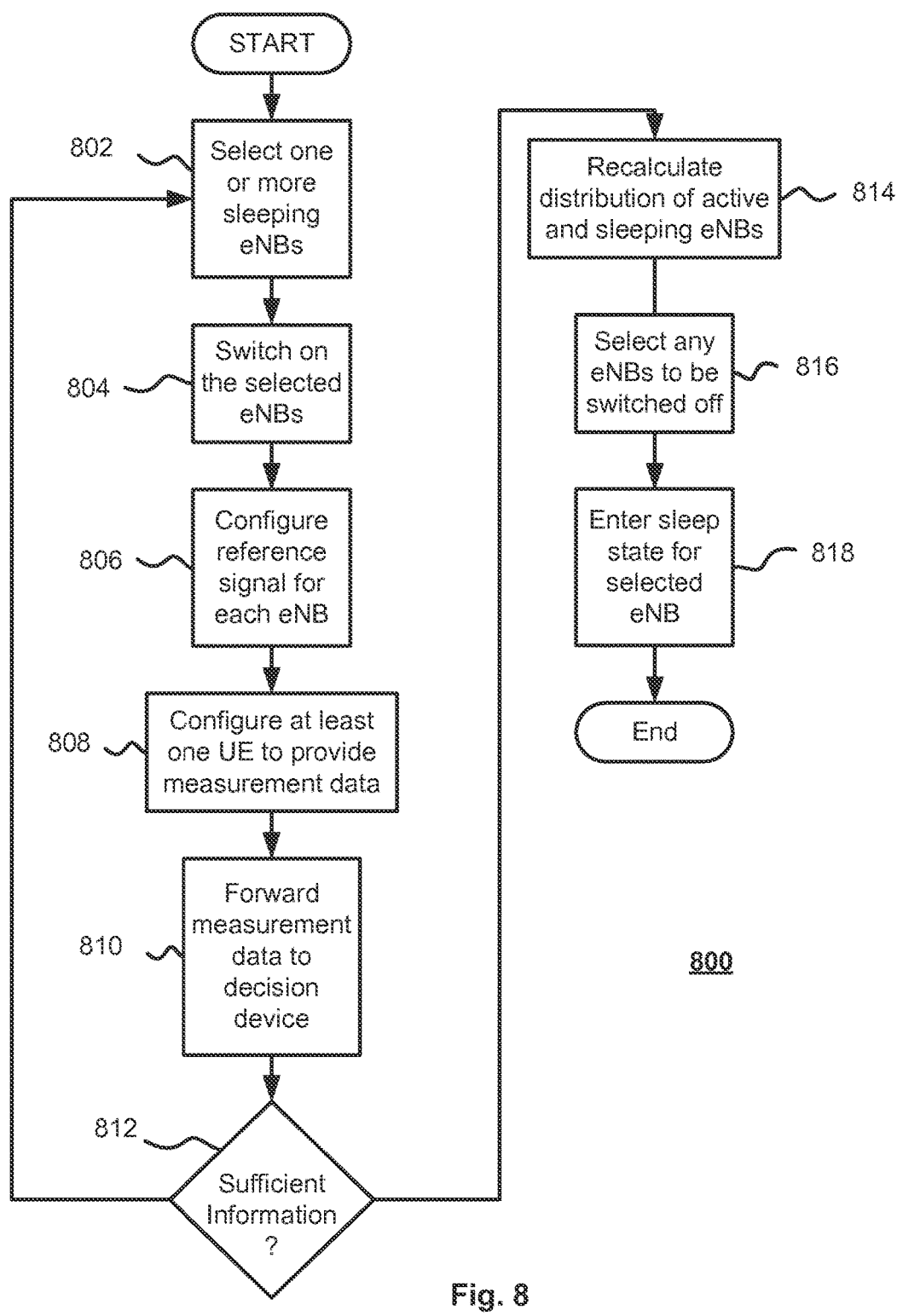
FIG. 8 shows a second flowchart for network management.

Referring to FIG. 8, there is shown a flowchart 800 of a further embodiment. The network management system 202, or, more particularly, the processing circuitry 210 of the NMS 202, can be configured to implement the processing depicted in and described with reference to FIG. 8. At step 802, one or more than one eNB of inactive eNBs of a cellular system is selected to have a change of state. The change of state is realised at step 804 in which the selected one or more than one eNB is moved from the inactive, or sleep, state to an active state in which one or more than one signal is output that can be used by a receiving UE to assess channel conditions. The selected one or more than one eNB is instructed, at step 806, to commence transmitting such a signal that can be used by a receiving UE to assess channel conditions. The UE 106 is instructed at step 808 to provide measurement data associated with channel conditions, that is, associated with the radio environment. The measurement data is forwarded, at step 810, to a network element, such as, for example, the above described network management system 202, at which a determination is made, at step 812, regarding whether or not sufficient measurement data has been collated to take a decision on changing or otherwise updating the geographical distribution of the active eNBs. If the decision at step 812 is that there is insufficient such measurement data, processing resumes at step 802 where one or more than one further eNB is selected to be switched ON and steps 804 to 812 are repeated. For example, the network management policy may prescribe a one or more than one rule that is applied in taking the decision. Embodiments can be realised in which the rule relates to whether or not measurement data has been received relating to all base stations instructed to transmit the reference signal. If such measurement data has not been received from all such base stations, then steps 804 to 812 could be repeated. One skilled in the art will appreciate that one or more than one additional rule might be applied such as, for example, if measurement data from a prescribed number or percentage of base stations instructed to transmit a reference signal has been received, then the determination would be deemed to be sufficient. If the determination at step 812 is that sufficient measurement data has been collated, the processing continues at step 814 where a new distribution of active eNBs is determined. Alternatively, or additionally, a determination is made regarding any presently active eNBs that can be switched OFF. At step 816, any eNBs that are not needed or that have become redundant are selected to be switched OFF. At step 818, a command is output to give effect to the decision to switch OFF any such redundant cells.

The measurement data or other data provided by the UE 106 to allow the performance of the network, such as for example the radio environment, to be assessed can comprise Channel Quality Information (CQI).

Embodiments can be realised in which the network management system 202 can implement the methods described herein and, in particular, shown in the above flowcharts. Alternatively, or additionally, rather than the network management system 202 implementing embodiments of the present invention, some other network element or apparatus can be used to implement embodiments of the invention.

The embodiments herein have been described with reference to the selection of inactive cells as being deterministic. However, embodiments are not limited thereto. Embodiments can be realised in which the selection is random.

Although the above embodiments have been described with reference to two states, that is, an ON state and an OFF state, embodiments are not limited thereto. Alternatively, or additionally, embodiments are provided in which there is a predetermined number of states. For example, embodiments can be realised in which there are three states. The three states can be an active state, in which an eNB of a cell is not in a sleep state and is presently serving at least one respective user equipment, an intermediate state, in which an eNB of a cell is not in a sleep state but is presently not serving at least one respective user equipment, and an inactive state such as, for example, a sleep state, in which an eNB of a cell is in a lower power consumption mode. Embodiments can be realised in which the lower power consumption mode is an OFF state.

Although the eNBs corresponding to the cells in the cellular system 300 have been classified as being wide area base stations to at least one of local area base stations and home base stations, embodiments are not limited to such an arrangement. Any and all embodiments described herein can take any starting and ending base station classes in the hierarchy of base stations. For example, the largest base station class of the cellular system 300 might correspond to the local area base station with various sizes, such as at least one size, of home base station below that local area base station class. Alternatively, the largest area base station class might be a wide area base station with at least one of the other base stations in the lower base station classes being a medium base station class, a local area base station or a home base station class. The base station classes of the base stations constituting the cellular system 300 can comprise any permutation or combination of a predetermined number of base stations classes such as, for example, the above-described wide area base station class, the medium range base station class, the local area base station class and the home base station class taken jointly and severally in any and all combinations.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or machine readable storage such as, for example, DVD, memory stick or solid state medium. It will be appreciated that a storage device and storage medium are embodiments of non-transitory machine-readable storage that are suitable for storing a program or programs comprising instructions that, when executed, implement embodiments described and claimed herein. Accordingly, embodiments provide machine executable code for implementing a system, device, apparatus or method as described herein or as claimed herein and non-transitory machine readable storage storing such a program. Still further, such programs may be conveyed electronically via any medium such as a communication signal carried over a wired or wireless connection and embodiments suitably encompass the same.

Any such hardware can take the form of a processor, suitably programmable, such as for example, a programmable general purpose processor designed for mobile devices, a FPGA, or an ASIC. The foregoing can constitute embodiments of processing circuitry to perform the functions of the above examples and embodiments. Any such hardware can also take the form of a chip or chip set arranged to operate according to any one or more of the above described diagrams, such diagrams and associated descriptions being taken jointly or severally in any and all permutations.

Although the examples and embodiments have been described separately with respect to their accompanying drawings, embodiments are not limited thereto. Embodiments can be realised in which the embodiments or examples associated with the figures can be taken jointly and severally in any and all permutations. For example, the features of FIG. 1, and/or the features of the description of FIG. 1, can be taken together with the features of FIG. 2 or the description of FIG. 2 and so on.

Where variations of examples or embodiments have been presented as being at least a member of an enumerated list, either with or without the accompanying language "taken jointly or severally in any and all permutations", it is clear that all permutations of such enumerated list members are contemplated, which is made more emphatic by the accompanying language "taken jointly and severally in any and all permutations" or, where appropriate, "taken jointly and severally in any and all combinations".

In the embodiments described herein, it will be appreciated that a set can comprise one or more than one member. Therefore, for example, the set of inactive eNBs may comprise a single inactive eNB or a plurality of inactive eNBs. Furthermore, the language "active cell" and "inactive cell" can be used synonymously with the language "active base station", "active eNB" and "inactive base station" and "inactive eNB".

Although the above embodiments have been described with reference to using an assessment criterion, alternative or additional embodiments can be realised in which a complex criterion is established. For example, the complex criterion can comprise a multivariate optimization problem expressed and solved using linear programming techniques such as, for example, the Simplex Method. Such a multivariate optimisation can seek to achieve a balance between a plurality of variables such as, for example, UE power consumption and signal to interference and noise ratio.

Embodiments of the present invention can be applied to, for example, broadband wireless wide area networks (WWANs). However, embodiments are not limited thereto and can be applied to other types of wireless networks where the same or similar advantages may be realised. Such networks specifically include, if applicable, wireless local area networks (WLANs), wireless personal area networks (WPANs) and/or wireless metropolitan area networks (WMANs) such. Further, embodiments may be realised using one or a number of access and modulation techniques, such as, for example, Orthogonal Frequency Division Multiplexing (OFDM) or multi-user OFDM, otherwise referred to as Orthogonal Frequency Division Multiple Access (OFDMA) and, for example, other air interfaces including single carrier communication channels or a combination of protocols or other air interfaces where suitably applicable.

Furthermore, embodiments may be used in a variety of applications including transmitters and receivers of a radio system, although the present invention is not limited in this respect. Radio systems specifically included within the scope of embodiments of the present invention include, but are not limited to, network interface cards (NICs), network adaptors, fixed or mobile client devices, relays, base stations, femtocells, gateways, bridges, hubs, routers, access points, or other network devices. Further, the radio systems within the scope of embodiments of the invention may be implemented in cellular radiotelephone systems, satellite systems, two-way radio systems as well as computing devices including such radio systems including personal computers (PCs), tablets and related peripherals, personal digital assistants (PDAs), personal computing accessories, hand-held communication devices and all systems which may be related in nature and to which the principles of the inventive embodiments could be suitably applied.

Still further, the above embodiments have been described with reference to a 3GPP LTE network. However, embodiments are not limited to such a network. Embodiments can be realised within the context of another type of network, such as, for example, an IEEE 802.11 or an IEEE 801.16 wireless network, or any other type of network.

Although embodiments of the present invention have been described as being implemented by a network management system, embodiments are not limited thereto. Embodiments can be implemented or realised by another apparatus that is able to influence the operation of the base stations, such as the above described eNBs, of the cells of the cellular system, or any one or more than one of the network elements described with reference to FIG. 1 such as, for example, the MME 102-2, the S-GW 102-4, the P-GW 102-6, the PCRF 102-10, or any other apparatus such as, for example, another network apparatus forming part of the external data packet network 108.

Although the above embodiments have been described with reference to a UE 106 and an eNB 104, embodiments are not limited thereto. Embodiments can be realised in which the mobile network comprises a plurality of UEs and a plurality of base stations.

The above embodiments have been described with reference to assessing at least one performance metric associated with at least one active base station of the active base stations. However, embodiments can be realised in which the assessment is based on one or more than one performance metric such as, for example, power consumption of the UE 106 and the eNB 104 or interference. Furthermore, although the embodiments assessing at least one performance metric associated with at least one active base station of the active base stations have been described with reference to at least one performance metric, embodiments can additionally or alternatively be realised in which a plurality of performance metrics, each associated with at least one of respective UEs and respective base stations, is used as the basis for determining which active cells should be rendered inactive.

Embodiments can be realised according to any of the following clauses taken jointly and severally in any and all permutations:

Clause 1: A method for managing a set of base stations of wireless cells for serving a user equipment, the set of base stations comprising a set of active base stations and a set of inactive base stations, the method comprising activating a first set of selected base stations of the set of inactive base stations, assessing at least one performance metric associated with at least one active base station of the active base stations; and deactivating a set of selected base stations of the active base stations in response to said assessing.

Clause 2: The method of clause 1 in which said assessing comprises evaluating at least one performance metric associated with the radio environment of the at least one active base station.

Clause 3: The method of either of clauses 1 and 2 in which the performance metric comprises a measure associated with at least one of a received power associated with the user equipment and the at least one active base station, a quality of service associated with one or both of the user equipment and the at least one active base station, a traffic load associated with the at least one active base station, a signal to noise ratio of a predetermined signal of at least one of the user equipment and the at least one active base station, a signal to interference and noise ratio of a predetermined signal of at least one of the user equipment and the at least one active base station, interference associated with a predetermined signal of at least one of the user equipment and the at least one active base station, a location associated with the at least one active base station, a mutual location associated with the user equipment and the at least one active base station, a number of user equipments associated with the at least one active base station, and channel state information associated with the user equipment and the at least one active base station.

Clause 4: The method of any of clauses 1 to 3 in which the assessing comprises requesting the user equipment to provide measurement data associated with the at least one active base station.

Clause 5: The method of clause 4 in which the measurement report comprises data relating to a reference signal associated with the at least one active base station.

Clause 6: The method of clause 5 in which the reference signal comprises at least one of a channel state information reference signal, a cell specific reference signal, a position reference signal, a sounding reference signal and a demodulation reference signal.

Clause 7: The method of any preceding clause in which said assessing comprises determining one or more than one distance associated with the user equipment and the at least one active base station.

Clause 8: The method of any preceding clause in which activating the first set of selected base stations comprises assessing a criterion associated with the active base stations.

Clause 9: The method of clause 8 in which the criterion associated with the active base stations comprises assessing a criterion associated with at least one other active base station.

Clause 10: The method of clause 9 in which the criterion associated with the active base stations comprises a criterion associated with different classes of one or more than one active base station.

Clause 11: The method of any preceding clause in which said assessing comprises establishing multivariate optimisation criterion associated with the user equipment and the active base stations and solving that multivariate optimisation criterion.

Clause 12: The method of any preceding clause in which the base stations comprise at least one or more than one of: at least two wireless base stations serving a common geographical region, and at least two wireless base stations having different classes in a hierarchical arrangement of the base stations.

Clause 13: A method of network management, the network comprising a plurality of wireless cells, the plurality of wireless cells comprising one or more than one active wireless cell and one or more than one inactive wireless cells, the method comprising adjusting the geographical distribution of at least one of the active and inactive wireless cells, evaluating a measurement associated with the radio environment of the adjusted geographical distribution of the wireless cells, and, in response to said evaluating, at least one of activating inactive cells and rendering inactive active cells.

Clause 14: An apparatus for managing a plurality of base stations of wireless cells for serving a user equipment, the plurality of wireless base stations comprising a set of active base stations and a set of inactive base stations, the apparatus comprising processing circuitry to: activate a first set of inactive base stations of the set of inactive base stations, assess the radio environment associated with the active base stations; and deactivate a set of base stations of the active base stations in response to said assessing.

Clause 15: The apparatus of clause 14 in which said processing circuitry to assess the radio environment associated with the active base stations comprises processing circuitry to evaluate at least one criterion associated with the radio environment.

Clause 16: The apparatus of clause 15 in which the criterion associated with the radio environment comprises a measure associated with at least one of a received power associated with the user equipment and the at least one active base station, a quality of service associated with one or both of the user equipment and the at least one active base station, a traffic load associated with the at least one active base station, a signal to noise ratio of a predetermined signal of at least one of the user equipment and the at least one active base station, a signal to interference and noise ratio of a predetermined signal of at least one of the user equipment and the at least one active base station, interference associated with a predetermined signal of at least one of the user equipment and the at least one active base station, a location associated with the at least one active base station, a mutual location associated with the user equipment and the at least one active base station, a number of user equipments associated with the at least one active base station, and channel state information associated with the user equipment and the at least one active base station.

Clause 17: The apparatus of any of clauses 14 to 16 in which the processing circuitry to assess the radio environment associated with the active base stations comprises processing circuitry to request the user equipment to provide measurement data associated with the active base stations.

Clause 18: The apparatus of clause 17 in which the measurement report comprises data relating to a reference signal associated with at least one of the user equipment and the at least one active base station.

Clause 19: The apparatus of clause 18 in which the reference signal comprises at least one of a channel state information reference signal, a cell specific reference signal, a position reference signal, a sounding reference signal and a demodulation reference signal.

Clause 20: The apparatus of any of clauses 14 to 19 in which the processing circuitry to assess the radio environment associated with the active base stations comprises processing circuitry to determine one or more than one distance associated with the user equipment and the active base stations.

Clause 21: The apparatus of any of clause 14 to 20 in which the processing circuitry to activate the first set of inactive base stations comprises processing circuitry to assess a criterion associated with the active base stations.

Clause 22: The apparatus of clause 21 in which the criterion associated with the active base stations comprises assessing a criterion associated with at least one other active base station.

Clause 23: The apparatus of clause 22 in which the criterion associated with the active base stations comprises a criterion associated with different classes of one or more than one base station.

Clause 24: The apparatus of any of clause 14 to 23 in which the processing circuitry to assess the radio environment comprises processing circuitry to establish multivariate optimisation criterion associated with the user equipment and the base stations and solving that multivariate optimisation criterion.

Clause 25: The apparatus of any of clauses 14 to 24 in which the base stations comprise at least one or more than one of: at least two wireless base stations serving a common geographical region, and at least two wireless base stations having different classes in a hierarchical arrangement of the plurality of base stations.

Clause 26: An apparatus for network management, the network comprising a plurality of wireless cells, the plurality of wireless cells comprising one or more than one active wireless cell and one or more than one inactive wireless cells, the apparatus comprising processing circuitry to adjust the geographical distribution of at least one of active and inactive wireless cells, evaluate the performance of the network associated with the adjusted geographical distribution of the wireless cells, and to activate inactive cells in response to the processing circuitry to evaluate the performance of the network or to render inactive active cells in response to the processing circuitry to evaluate the performance of the network Clause 27: Computer executable program code comprising instructions arranged, when executed, to implement the method of any of clauses 1 to 13.

Clause 28: Computer readable storage storing a computer executable program code of clause 27.

Clause 29. A method, eNodeB, apparatus, network element, computer program and computer readable storage substantially as described herein with reference to and/or as illustrated in the accompanying drawings.

Clause 30: An apparatus for managing a set of eNBs for serving a user equipment, the apparatus comprising processing circuitry to:

process data defining a geographical radio service area provided by the set of eNBs; the set of eNBs comprising a first set of eNBs, in a first respective power state, available to serve the user equipment and a second set of eNBs, in a second respective power state, unavailable to serve the user equipment, the processing circuitry to process the data defining the geographical radio service area comprising processing circuitry for:

adapting the data defining the geographical radio service area provided by the set of eNBs by changing at least one eNB of the second set of eNBs from the second respective power state to a first respective power state in the first set of eNBs to define an adapted geographical radio service area provided by the set of eNBs, processing performance data associated with the adapted geographical radio service area provided by the set of eNBs, and establishing data defining a further geographical radio service area provided by the first set of eNBs in response to said processing.

Clause 31: An apparatus of clause 30, in which said processing circuitry for establishing comprises transitioning at least one eNB of the first set of eNBs from a first respective power state to the second set of eNBs having the second respective power state.

Clause 32: An apparatus of either of clauses 30 and 31, in which said processing performance data associated with the adapted geographical radio service area provided by the set of eNBs comprises processing a performance metric associated with at least one of the user equipment and at least one eNB of the first set of eNBs to determine whether or not the performance of the first set of eNBs meets at least one criterion.

Clause 33: An apparatus of clause 32 in which said establishing comprises adapting the data defining the adapted geographical radio service area to provide a different geographical radio service area.

Clause 34: An apparatus of clause 33 in which said adapting the data defining the adapted geographical radio service area to provide a different geographical radio service area comprises at least one of switching a first eNB of the first set of eNBs that was previously in the second set of eNBs back the second set of eNBs having the second respective power state and switching a first eNB of the first set of eNBs that was in the first set of eNBs to the second set of eNBs having the second respective power state.

Clause 35: The apparatus of clause 32 in which the at least one criterion comprises a measure associated with at least one of a received power associated with the user equipment and at least one eNB of the first set of eNBs, a quality of service associated with one or both of the user equipment and at least one eNB of the first set of eNBs, a traffic load associated with at least one eNB of the first set of eNBs, a signal to noise ratio of a predetermined signal of at least one of the user equipment and at least one eNB of the first set of eNBs, a signal to interference and noise ratio of a predetermined signal of at least one of the user equipment and at least one eNB of the first set of eNBs, interference associated with a predetermined signal of at least one of the user equipment and at least one eNB of the first set of eNBs, a location or distance associated with at least one eNB of the first set of eNBs, a mutual location associated with the user equipment and at least one eNB of the first set of eNBs, a number of user equipments associated with at least one eNB of the first set of eNBs, and channel state information associated with the user equipment and at least one eNB of the first set of eNBs.

Clause 36: The apparatus of any of clauses 30 to 35 in which the processing circuitry comprises processing circuitry associated with requesting the user equipment to provide measurement data associated with one or more than one eNB of the first set of eNBs.

Clause 37: The apparatus of clause 36 in which the measurement data comprises data relating to a reference signal associated with at least one of the user equipment and at least one eNB of the first set of eNBs.

Clause 38: The apparatus of clause 37 in which the reference signal comprises at least one of a channel state information reference signal, a cell specific reference signal, a position reference signal, a sounding reference signal and a demodulation reference signal.

Clause 39: The apparatus of any of clauses 30 to 38 in which the processing circuitry for processing performance data comprises processing circuitry to determine one or more than one distance associated with the user equipment and one or more than one eNB of the first set of eNBs.

Clause 40: The apparatus of any of clauses 30 to 39 in which the processing circuitry to process performance data associated with the adapted geographical radio service area provide by the first set of eNBs comprises processing circuitry to establish multivariate optimisation criterion associated with the user equipment and at least one eNB of the first set of eNBs and processing circuitry for solving that multivariate optimisation criterion.

Clause 41: The apparatus of clause 40 in which processing circuitry for establishing the data defining the further geographical radio service area provided by the first set of eNBs comprises selecting one or more than one eNB of the first set of eNBs according to said solving of the multivariate optimisation criterion to provide the data defining the further geographical radio service area provided by the first set of eNBs.

Clause 42: The apparatus of any of clauses 30 to 41 further comprising processing circuitry to output a request to at least one of the user equipment and one or more than one eNB of the first set of eNBs to provide measurement data associated with the radio environment provided by at least part of the adapted geographical radio service area.

Clause 43: The apparatus of clause 41 further comprising processing circuitry to receive performance data in response output the request to at least one of the user equipment and one or more than one eNB of the first set of eNBs to provide measurement data associated with the radio environment provided by at least part of the adapted geographical radio service area.

Clause 44: The apparatus of any of clauses 30 to 43 further comprising processing circuitry for outputting an instruction to one or more eNB of the first set of eNBs and to one or more of the second set of eNBs to adopt respective power states.

Clause 45: An apparatus for network management, the network comprising a plurality of wireless cells, the plurality of wireless cells comprising one or more than one active wireless cell and one or more than one inactive wireless cells, the apparatus comprising processing circuitry to adjust the geographical distribution of at least one of active and inactive wireless cells, evaluate the performance of the network associated with the adjusted geographical distribution of the wireless cells, and to activate inactive cells in response to the processing circuitry to evaluate the performance of the network or to render inactive active cells in response to the processing circuitry to evaluate the performance of the network.

The invention claimed is:

1. An apparatus for managing a plurality of base stations of wireless cells for serving a user equipment, the plurality of wireless base stations comprising a set of active base stations and a set of inactive base stations, the apparatus comprising:

storage to store a network management policy; and processing circuitry, coupled with the storage, the processing circuitry to:

activate a first set of inactive base stations of the set of inactive base stations based on the network management policy;

assess, after activation of the first set of inactive base stations, a radio environment associated with the active base stations; and deactivate a set of base stations of the active base stations in response to an assessment of the radio environment following said activation, wherein the apparatus is provided in or in a part of a network management system, and wherein the network management policy includes one or more objectives against which network performance can be assessed, including managing power consumption of at least one user equipment (UE) or base station during at least one of a data exchange or a signaling exchange.

2. The apparatus of claim 1 in which said processing circuitry to assess the radio environment associated with the active base stations comprises processing circuitry to evaluate at least one criterion associated with the radio environment.

3. The apparatus of claim 2 in which the criterion associated with the radio environment comprises a measure associated with at least one of a received power associated with the UE and at least one active base station, a quality of service associated with one or both of the UE and the at least one active base station, a traffic load associated with the at least one active base station, a signal to noise ratio of a predetermined signal of at least one of the UE and the at least one active base station, a signal to interference and noise ratio of a predetermined signal of at least one of the UE and the at least one active base station, interference associated with a predetermined signal of at least one of the UE and the at least one active base station, a location associated with the at least one active base station, a mutual location associated with the UE and the at least one active base station, a number of UEs associated with the at least one active base station, and channel state information associated with the UE and the at least one active base station.

4. The apparatus of claim 1 in which the processing circuitry to assess the radio environment associated with the active base stations comprises processing circuitry to request the UE to provide measurement data associated with the active base stations.

5. The apparatus of claim 4 in which the measurement data comprises data relating to a reference signal associated with at least one of the UE and the at least one active base station.

6. The apparatus of claim 5 in which the reference signal comprises at least one of a channel state information reference signal, a cell specific reference signal, a position reference signal, a sounding reference signal and a demodulation reference signal.

7. The apparatus of claim 1 in which the processing circuitry to assess the radio environment associated with the active base stations comprises processing circuitry to determine one or more than one distance associated with the UE and the active base stations.

8. The apparatus of claim 1 in which the processing circuitry to activate the first set of inactive base stations comprises processing circuitry to asses a criterion associated with the active base stations.

9. The apparatus of claim 8 in which the criterion associated with the active base stations comprises assessing a criterion associated with at least one other active base station.

10. The apparatus of claim 9 in which the criterion associated with the active base stations comprises a criterion associated with different classes of one or more than one base station.

11. The apparatus of claim 1 in which the processing circuitry to assess the radio environment comprises processing circuitry to establish multivariate optimisation criterion associated with the UE and the base stations and solving that multivariate optimisation criterion.

12. The apparatus of claim 1 in which the base stations comprise at least one or more than one of: at least two wireless base stations serving a common geographical region, and at least two wireless base stations having different classes in a hierarchical arrangement of the plurality of base stations.

13. One or more non-transitory, computer-readable media having instructions that, when executed by one or more processors, cause a network management system to manage a set of base stations of wireless cells for serving one or more UEs, the set of base stations comprising a set of active base stations and a set of inactive base stations, wherein to manage the set of base stations, the network management system is to:

activate a first set of selected base stations of the set of inactive base stations based on a network management policy;

assess, after said activation of the first set of selected base stations, at least one performance metric associated with at least one active base station of the active base stations; and deactivate a set of selected base stations of the active base stations in response to said assessing wherein the network management policy includes one or more objectives against which network performance can be assessed, including managing power consumption of at least one UE or base station during at least one of a data exchange or a signaling exchange.

14. The one or more non-transitory, computer-readable media of claim 13 in which said assessing comprises evaluating at least one performance metric associated with a radio environment of the at least one active base station.

15. The one or more non-transitory, computer-readable media of claim 13 in which the performance metric comprises a measure associated with at least one of a received power associated with the UE and the at least one active base station, a quality of service associated with one or both of the UE and the at least one active base station, a traffic load associated with the at least one active base station, a signal to noise ratio of a predetermined signal of at least one of the UE and the at least one active base station, a signal to interference and noise ratio of a predetermined signal of at least one of the UE and the at least one active base station, interference associated with a predetermined signal of at least one of the UE and the at least one active base station, a location associated with the at least one active base station, a mutual location associated with the UE and the at least one active base station, a number of UEs associated with the at least one active base station, and channel state information associated with the UE and the at least one active base station.

16. The one or more non-transitory, computer-readable media of claim 13 in which to assess the network management system is to request a UE to provide measurement data associated with the at least one active base station.

17. The one or more non-transitory, computer-readable media of claim 16 in which the measurement report data comprises data relating to a reference signal associated with the at least one active base station.

18. The one or more non-transitory, computer-readable media of claim 17 in which the reference signal comprises at least one of a channel state information reference signal, a cell specific reference signal, a position reference signal, a sounding reference signal and a demodulation reference signal.

19. The one or more non-transitory, computer-readable media of claim 13 in which to assess the network management system is to determine one or more than one distance associated with a UE and the at least one active base station.

20. The one or more non-transitory, computer-readable media claim 13 in which to activate the first set of selected base stations the network management system is to assess a criterion associated with the active base stations.

21. The one or more non-transitory, computer-readable media of claim 20 in which the criterion associated with the active base stations comprises assessing a criterion associated with at least one other active base station.

22. The one or more non-transitory, computer-readable media of claim 21 in which the criterion associated with the active base stations comprises a criterion associated with different classes of one or more than one active base station.

23. The one or more non-transitory, computer-readable media of claim 13 in which to assess the network management system is to establish multivariate optimisation criterion associated with the UE and the active base stations and solve that multivariate optimisation criterion.

* * * * *

UNITED STATES PATENT AND TRADEMARK OFFICE
CERTIFICATE OF CORRECTION

Page 1 of 1

PATENT NO.        : 10,159,002 B2
APPLICATION NO.   : 14/903576
DATED             : December 18, 2018
INVENTOR(S)       : Vadim Sergeyev et al.

It is certified that error appears in the above-identified patent and that said Letters Patent is hereby corrected as shown below:

Column 18
Line 9, replace: "to said assessing" with --to said assessing,--

Column 18
Line 57, replace: "media claim 13" with --media of claim 13--

Signed and Sealed this
Twelfth Day of February, 2019

Andrei Iancu
*Director of the United States Patent and Trademark Office*